United States Patent [19]

Iseki et al.

[11] Patent Number: 5,109,500
[45] Date of Patent: Apr. 28, 1992

[54] DISK DRIVE CONTROL UNIT HAVING SETS OF OPERATING COMMAND AND OPERATION LENGTH INFORMATION AND GENERATING END SIGNAL BASED UPON OPERATION LENGTH INFORMATION

[75] Inventors: Toshiyuki Iseki; Takashi Tsunehiro; Satoshi Kawamura, all of Yokohama; Masaki Mega, Mobara; Hiroshi Kurihara, Koganei, all of Japan

[73] Assignee: Hitachi, Ltd., Tokyo, Japan

[21] Appl. No.: 113,606

[22] Filed: Oct. 28, 1987

[30] Foreign Application Priority Data

Oct. 31, 1986 [JP] Japan ................. 61-258244
Mar. 20, 1987 [JP] Japan ................. 62-63705

[51] Int. Cl.$^5$ .......................... G06F 9/00; G06F 13/10
[52] U.S. Cl. .................................. 395/425; 364/236.2; 364/926.92; 364/952.1; 364/DIG. 2
[58] Field of Search ... 364/200 MS File, 900 MS File

[56] References Cited

U.S. PATENT DOCUMENTS

| | | | |
|---|---|---|---|
| 4,127,846 | 11/1978 | Raslavsky, III | 364/200 |
| 4,241,420 | 12/1980 | Fish et al. | 364/900 |
| 4,494,196 | 1/1985 | Greer | 364/200 |
| 4,509,118 | 2/1985 | Shenk | 364/200 |
| 4,525,801 | 6/1985 | Kuwabara | 364/900 |
| 4,535,404 | 8/1985 | Shenk | 364/200 |

FOREIGN PATENT DOCUMENTS 57-57355  4/1982  Japan .

OTHER PUBLICATIONS

G. Venkatesh, "Implementing an ESDI Controller with the Adaptec Chip Set", Adaptec, Inc., Milpitas, Calif., 1985.

*Primary Examiner*—Thomas C. Lee
*Assistant Examiner*—Ayni Mohamed
*Attorney, Agent, or Firm*—Antonelli, Terry, Stout & Kraus

[57] ABSTRACT

A disk control unit for writing data on or reading the same from a disk in a disk apparatus in response to an instruction from a host computer. The disk control unit has a plurality of command buffers for storing a group of operation information and operation length information corresponding to individual fields in the disk format of the disk apparatus. Prior to processing the length information is set in a counter and then is counted decrementally with progress of the processing steps, whereby an operation end signal is produced to control an address generator for the command buffers. The disk control unit also has a pointer register for storing a jump point address in response to indication of the operation information and outputting the stored address in response to indication of the other operation information to change the address of the address generator. The disk control unit further has a plurality of ID field registers for indiscriminately storing the ID field registers forindiscriminately storing the ID field address marks and the ID information in the disk format of the disk apparatus.

15 Claims, 13 Drawing Sheets

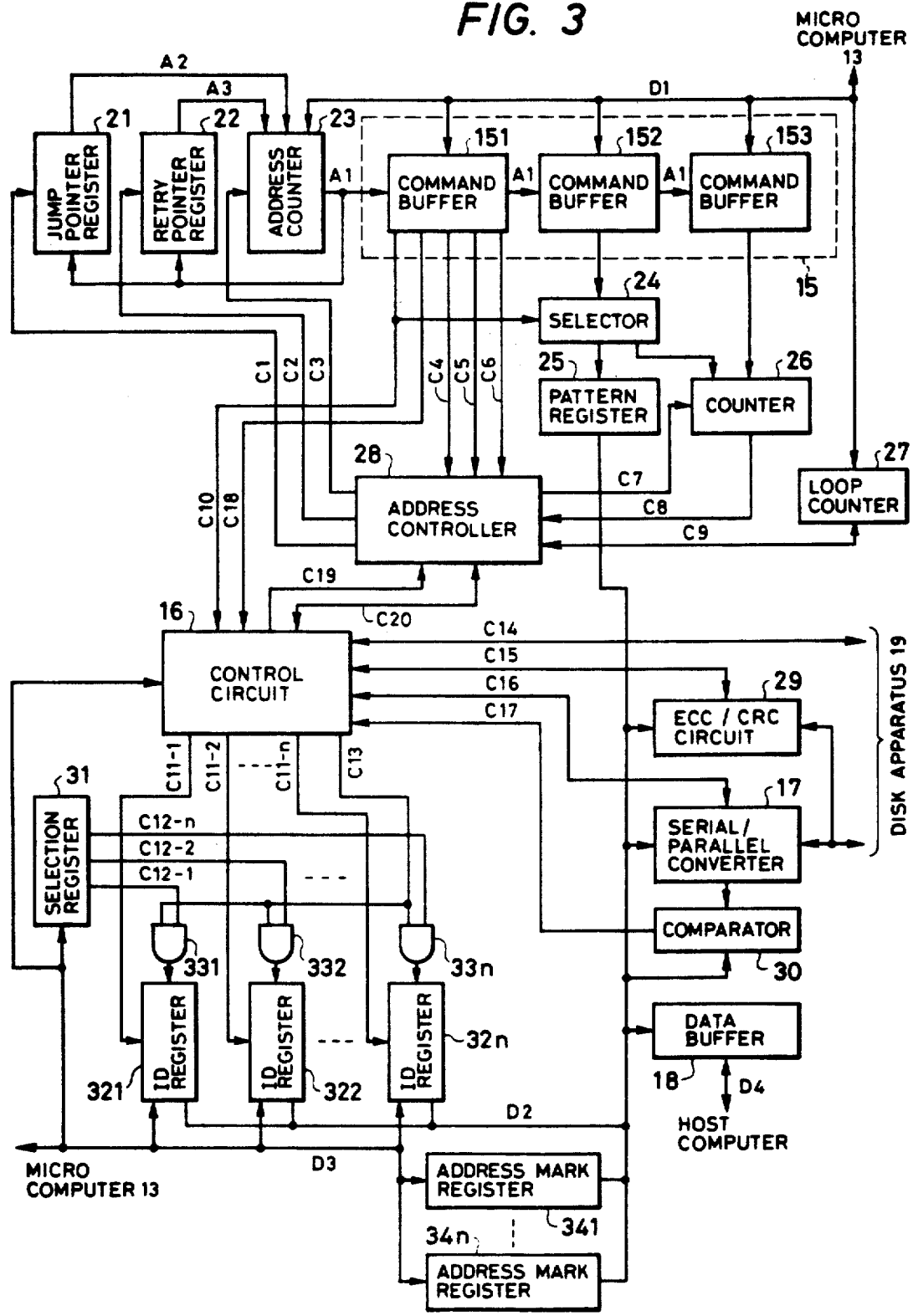

FIG. 5

| ADDRESS | COMMAND BUFFER 151 (OPERATION INFORMATION) | COMMAND BUFFER 152 (OPERATION LENGTH INFORMATION / FIXED PATTERN) | COMMAND BUFFER 153 (OPERATION LENGTH INFORMATION) |
|---|---|---|---|
| 0 | INDEX PULSE WAIT | 00 | 00 |
| 1 | GAP/SYNC. FIELD WRITE, JUMP POINTER SET | FIXED PATTERN | GAP/SYNC. FIELD LENGTH |
| 2 | ID FIELD WRITE | ID FIELD BYTE LENGTH (H) | ID FIELD BYTE LENGTH (L) |
| 3 | CRC WRITE | — | CRC BYTE LENGTH |
| 4 | GAP/SYNC. FIELD WRITE | FIXED PATTERN | GAP/SYNC. FIELD LENGTH |
| 5 | DATA FIELD WRITE | DATA FIELD BYTE LENGTH (H) | DATA FIELD BYTE LENGTH (L) |
| 6 | ECC WRITE, JUMP | — | ECC BYTE LENGTH |
| 7 | END | 00 | 00 |

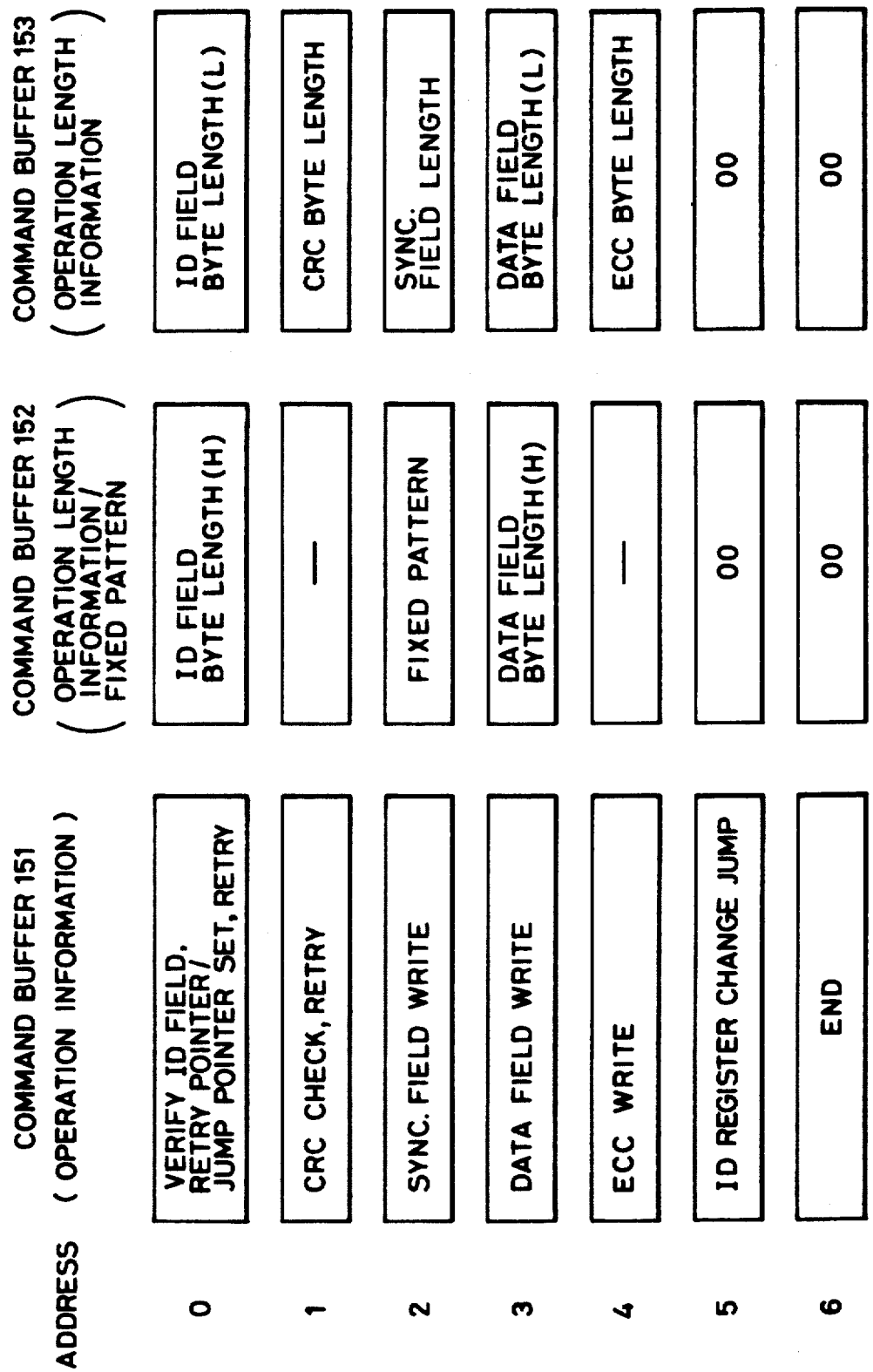

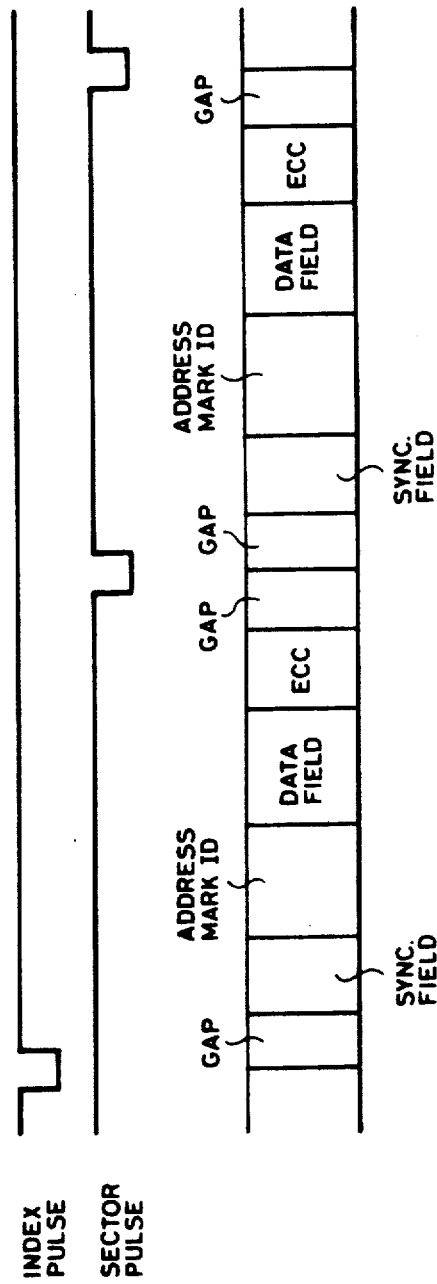

DISK DRIVE CONTROL UNIT HAVING SETS OF OPERATING COMMAND AND OPERATION LENGTH INFORMATION AND GENERATING END SIGNAL BASED UPON OPERATION LENGTH INFORMATION

BACKGROUND OF THE INVENTION

The present invention relates to a disk control unit and, more particularly, to a control unit adapted for disk apparatus employing different disk formats.

In disk apparatus, a track is generally formed of a plurality of sectors each composed of an ID field, a DATA field and so forth. With regard to such sectors, there are known some different formats of disks such as hard sector disk and soft sector disk. When a plurality of disk apparatus of such different formats are mutually connected, a disk control unit is required for controlling the various disk apparatus which consequently bring about disadvantages including enlargement of the circuit scale and increase of the production cost.

In order to solve the problems mentioned, it has been customary heretofore to adopt a constitution where a disk control unit processes each field in a programmable manner, and different processing functions depending on the individual fields are absorbed by software while common functions are executed by hardware. Out of the conventional examples, there is known a constitution where, as disclosed in Japanese Patent Publication No. 57 (1982)-36614 titled "Data Processor", operation designating information is fed to a disk control unit from a micro program in such a manner that, when a different processing operation is required relative to one field, the desired operation is designated by the disk control unit in accordance with the field structure.

FIG. 1 shows a block diagram of the above conventional example. This unit is equipped with a controlling memory 3 having a plurality of storage positions, wherein a micro program controller 1 stores, in accordance with the field structure, a group of operation designating information at predetermined positions respectively in the controlling memory 3. With progress of the processing operation relative to the field, the controlling memory 3 sequentially reads out the information from such predetermined storage positions under control of an address controller 2. A command generator 4 generates commands to perform the operation designated by the individual operation designating information thus read out. A read/write controller 5 performs read and write operations for the disk appararus in response to the command generated. In this stage, the field length is determined by a value preset in a field length counter 6 by the micro program controller 1.

When a gap between the fields is sufficiently wide and the operation designating information is changeable, the micro program controller 1 is capable of storing the operation designating information required per field. However, if the gap is narrow, it is necessary to previously store the operation designating information for the entire fields prior to start of a series of operations. Meanwhile, with regard to the length of each field, it needs to be stored in the field length counter 6 at the time to execute the operation for each field.

Thus, the micro program controller 1 needs to monitor an end instruction for the field processing step per field. In case an input/output instruction is received from a host computer during execution of one processing step, such information is analyzed and, if the input/output instruction is not concerned with the disk apparatus being driven at the present moment, a seek operation and so forth need to be performed for enhancing the read/write efficiency. Therefore the control action of the micro program controller 1 is complicated to eventually necessitate enlarging the scale of the micro program memory incorporated in the micro program controller 1. Furthermore, in executing the steps to process sequential fields, it becomes unavoidable that the scale of the controlling memory 3 is rendered greater.

Meanwhile, in reading one field, an address mark recorded at the top of the field is detected to find the boundary between bytes, but such address mark has a fixed value. Accordingly, in order to obtain a different field structure by changing the address mark, it is necessary to store a multiplicity of address marks previously in an address mark processor 7, hence enlarging the circuit scale of the processor 7 as well.

When any field with ID information is written in the constitution of FIG. 1, the ID information is received directly from the host computer and then is written on a disk, but still it is necessary to maintain monitoring for the host computer to know the write timing. Furthermore, in a comparison of the ID information, such information are once loaded in the host computer and then are compared therein, whereby the efficiency is deteriorated.

In the prior art mentioned, there exist some problems including that no consideration is given with regard to simultaneous operation for a plurality of input/output instructions fed from the host computer or to sequential operations for the individual fields either, and the scales of both the micro program controller 1 and the controlling memory 3 are inevitably enlarged.

Besides the above, for obtaining a changed field structure with a different address mark which is initially fixed in each field, a multiplicity of address marks need to be previously stored to consequently bring about increase of the scale.

In addition, the write and comparison of fields including ID information are dependent much on the host computer to eventually deteriorate the processing efficiency of the host computer.

SUMMARY OF THE INVENTION

It is an object of the present invention to provide a disk control method and unit capable of complying with a variery of disk formats.

Another object of the present invention resides in providing a low-cost multifunctional disk control unit.

And a further object of the present invention is to provide a disk control unit effective for processing various disk formats where the structures of ID fields representing the number of sectors are mutually different.

For the purpose of accomplishing the objects mentioned, the disk control unit of the present invention comprises an information storage device for storing a plurality of operation information and operation length information supplied as disk control information from a host computer, an address generation device for generating addresses to read out the above information, a count device for counting the length of each processing operation, and a control device for controlling the address of the address generation in response to the output of the count device.

The present invention further includes, in addition to the above, a plurality of ID field storage devices for indiscriminately storing address marks and ID information used for writing or comparing the ID fields, and a selection devices for instructing a change in the data of the designated ID information alone in the ID field storage devices during a multisector processing operation to read or write a plurality of sectors.

The information storage devices stores a plurality of operation information and operation length information supplied as disk control information from the host computer, and the address generation device generates addresses for sequentially reading out the operation information and the operation length information from the information storage devices. Meanwhile the count devices reads out the operation length information, then decreases its count in accordance with progress of executing the processing steps, and generates an operation end signal. The address control device changes performs the address generated from the address device to another address in response to indication of the operation information or the operation end signal. In the address control device, a desired address is stored in response to indication of the operation information and then is set as an address obtained from the address generation devices.

The plurality of ID field storage devices store the ID field address marks and the ID information, while the count devices stores the ID field byte length. The ID field storage device produces output information from a designated one of the ID field storage devices. The count devices decreases its count at each of the sequential designations of the ID field storage devices and produces an end signal upon arrival of the count at 0, thereby enabling designation of any desired address mark, ID information and byte length. Meanwhile the selection devices designates desired one of the ID field storage devices and changes the data of the specific ID information stored in the designated ID field storage devices.

BRIEF DESCRIPTION OF THE DRAWINGS

FIG. 3 is a block diagram of a preferred embodiment of the invention;

FIG. 5 shows exemplary information stored in a command buffer 15 at the time of write format processing operation in the embodiment of FIG. 3;

FIG. 9 shows exemplary information stored in the command buffer 15 at the time of processing the write data in the embodiment of FIG. 3;

FIG. 11 shows exemplary information stored in an ID register 32 in the embodiment of FIG. 3; and FIG. 12 is a schematic diagram showing another exemplary disk format for which the present invention is carried out.

DETAILED DESCRIPTION OF THE PREFERRED EMBODIMENTS

Figure 1:
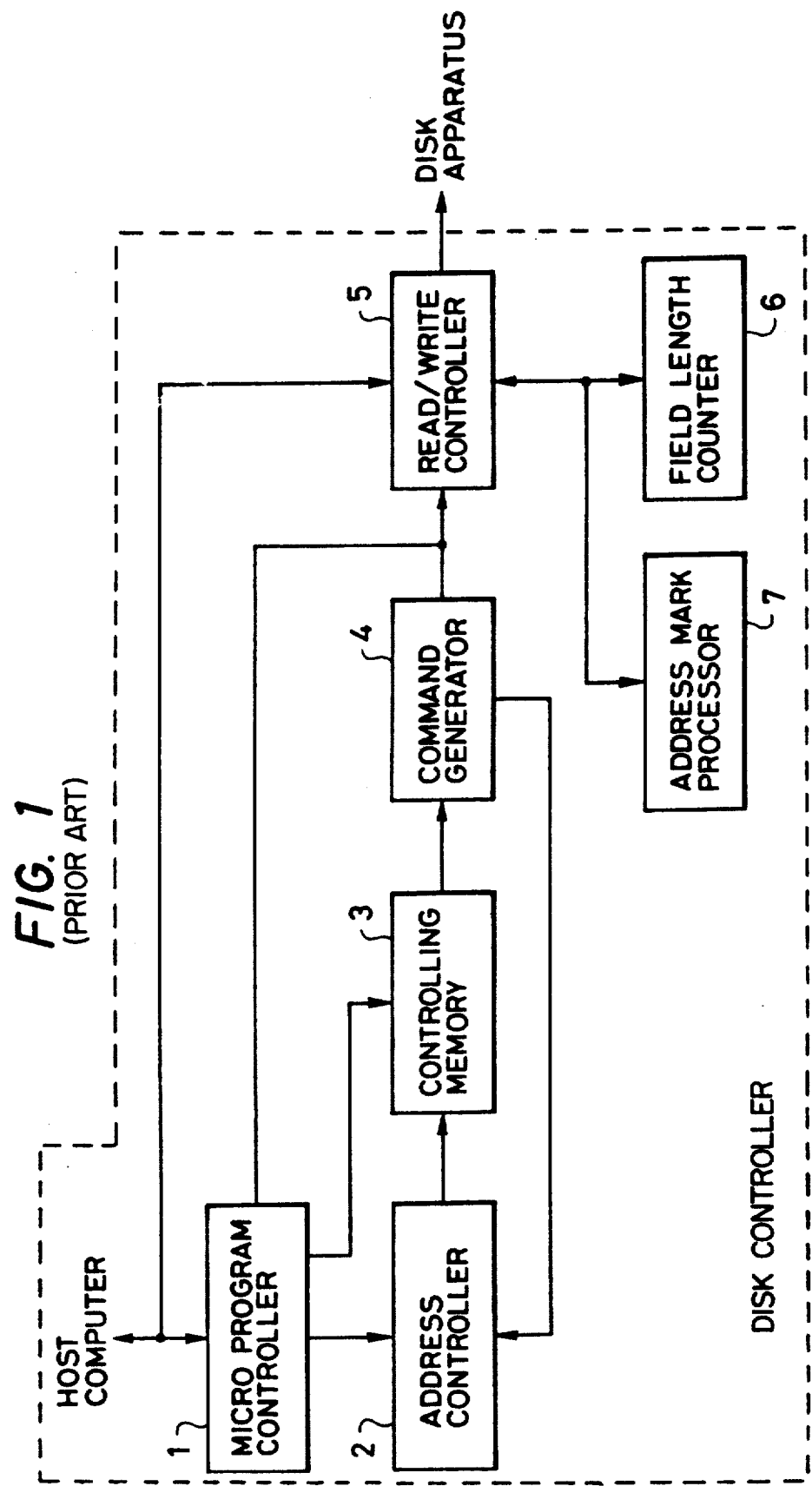
FIG. 1 is a block diagram of a conventional disk control unit.
Figure 2A:
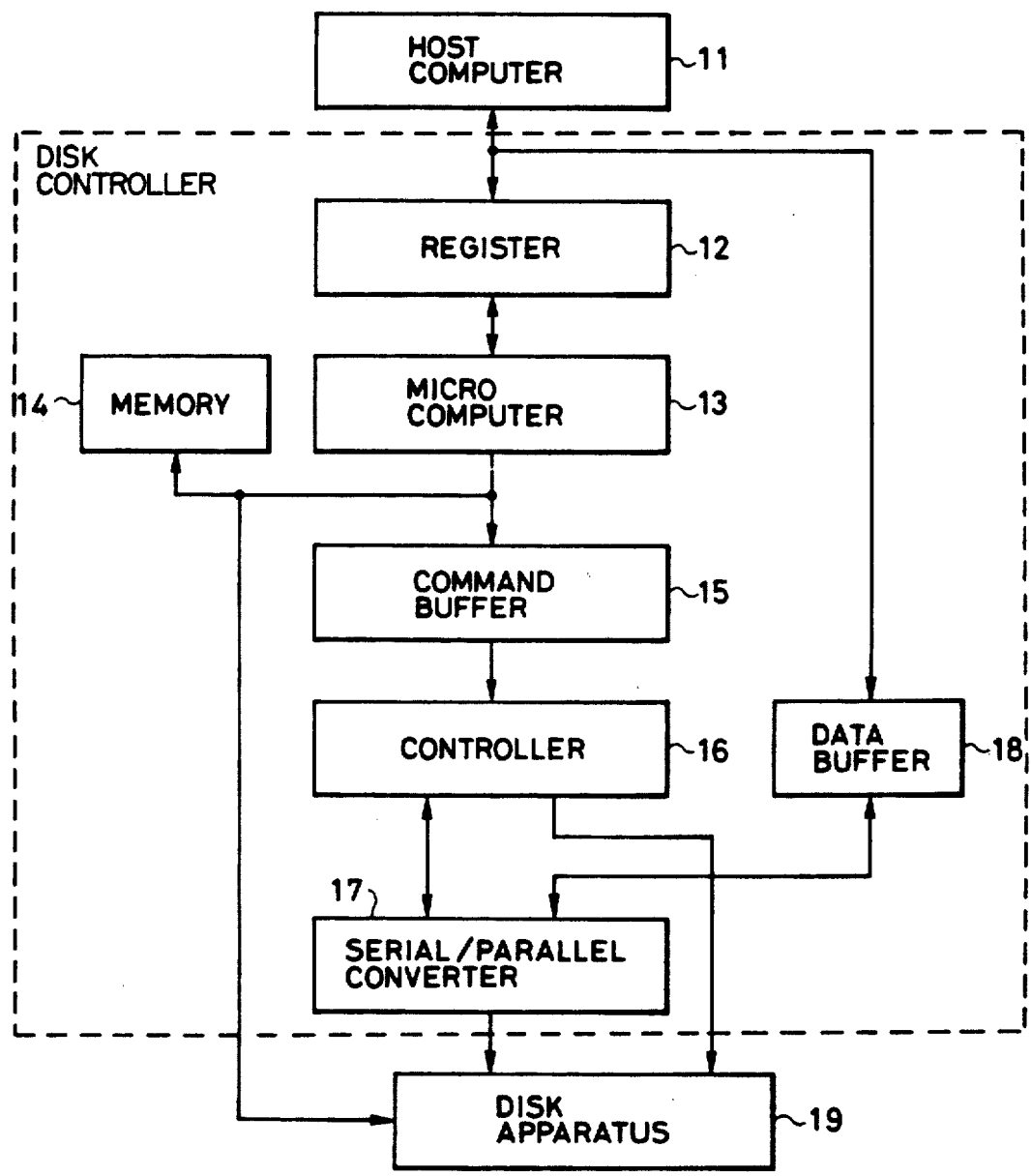
FIG. 2A is a block diagram schematically showing the entire constitution of a disk control unit according to the present invention.

Hereinafter the basic constitution of the present invention and a preferred embodiment thereof will be described with reference to the accompanying drawings. FIG. 2A is a block diagram of the whole system inclusive of a disk control unit of the invention, a disk apparatus and a host computer. There are shown a host computer 11; a register 12 for interfacing the host computer 11 with a micro computer 13 which controls the entire operation of the disk control unit; a memory 14 consisting of ROM for storage of program and RAM for work; a command buffer group 15 for storing a plurality of disk control information (including operation information and operation length information) to control the disk apparatus; a controller 16 for controlling the read and write operations of the disk apparatus; a serial/parallel converter 17 for performing serial-to-parallel and parallel-to-serial conversion of data; and a data buffer 18 for temporarily holding the data transferred between the host computer 11 and the disk apparatus 19. The controller 16 is composed of, for example, a PLA (programmable logic array).

Figure 2B:
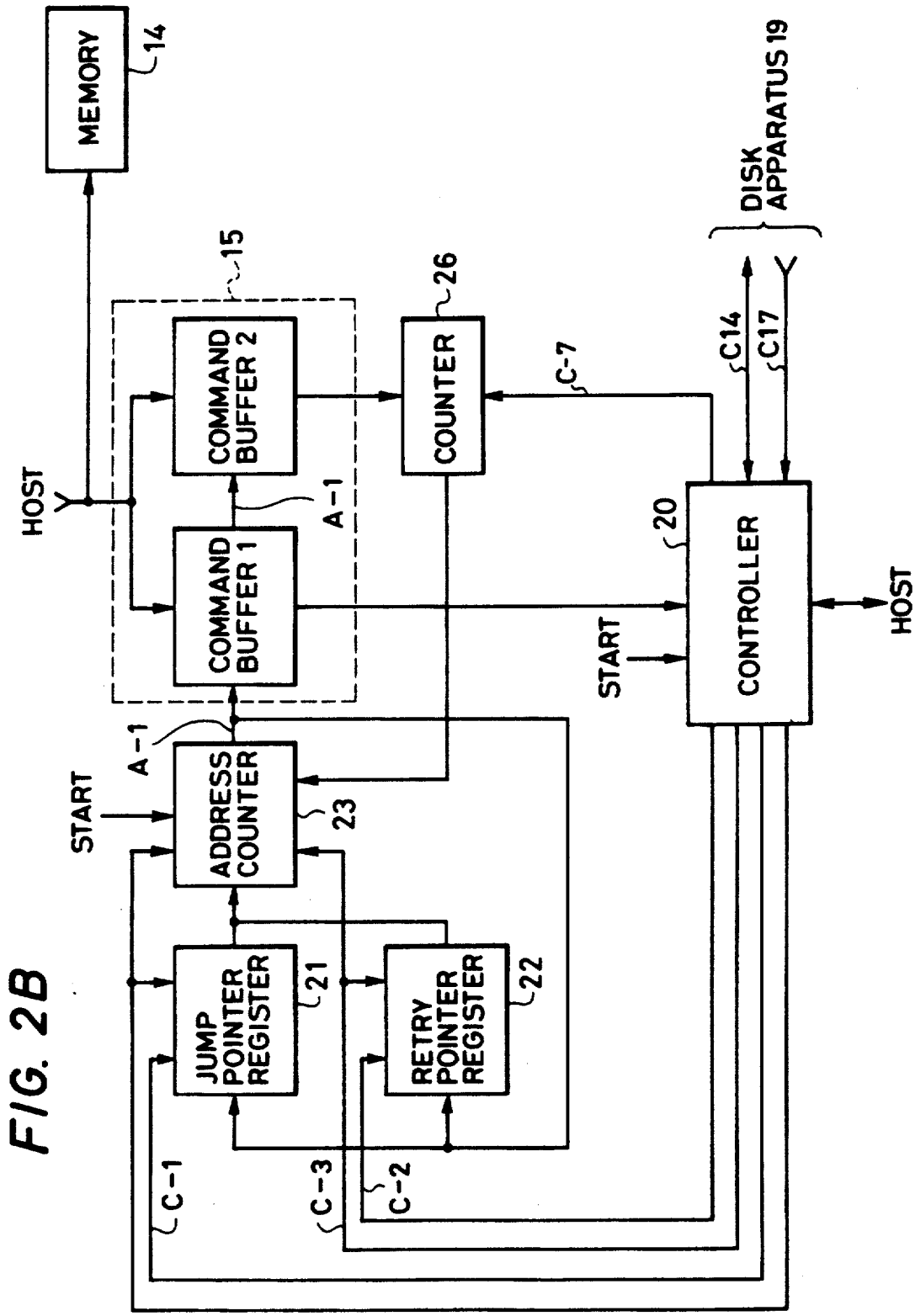
FIG. 2B is a block diagram of a first principal section in the disk control unit of the invention.

FIG. 2B is a schematic block diagram of a first principal section in the disk control unit of the present invention shown in FIG. 2A. There are included a jump pointer register 21 for storing a jump address and changing an address counter 23 by a controller 20, and a retry pointer register 22 for storing a retry address and changing the address counter 23 by the controller 20. The address counter 23 generates addresses of the command buffer group 15. The command buffer group 15 consists of command buffers 1 and 2 for storing operation information and operation length information, respectively. Denoted by 26 is a counter for counting the operation length. In this block diagram, the host corresponds to the host computer 11, register 12 and micro computer 13 shown in FIG. 2A; and the controller 20 comprises the control circuit 16, serial/parallel converter 17 and data buffer 18 shown in FIG. 2A.

In the continuous addresses of the command buffer 1, command groups are stored as operation information corresponding to the format of the disk apparatus 19 in response to format write command, data write command and data read command fed from the host. Meanwhile, operation length information of the commands stored in the command buffer 1 are stored in the corresponding addresses of the command buffer 2. The commands correspond respectively to the fields of sectors recorded on the disk, i.e. gap field, address mark field, ID information field, CRC field, data field and ECC field. The address counter 23 is cleared by a start signal from the host at the start of each command and counts up its value with progress of processing the fields.

At the start of each command, the operation length thereof is set in the counter 26 by the command buffer 2. The operation length thus set in the counter 26 is sequentially decreased in accordance with progress of processing the field and, upon arrival of the counted value at "0", execution of the relevant command comes to an end. Such end is transmitted to the address counter 23, which then starts counting up to execute the command for processing the next field.

As will be described in detail later, the jump pointer register 21 and the retry pointer register 22 serve to point a jump address and a retry address respectively to the address counter 23, and are used to read out the operation information and the operation length information from predetermined addresses in response to the command.

Figure 2C:
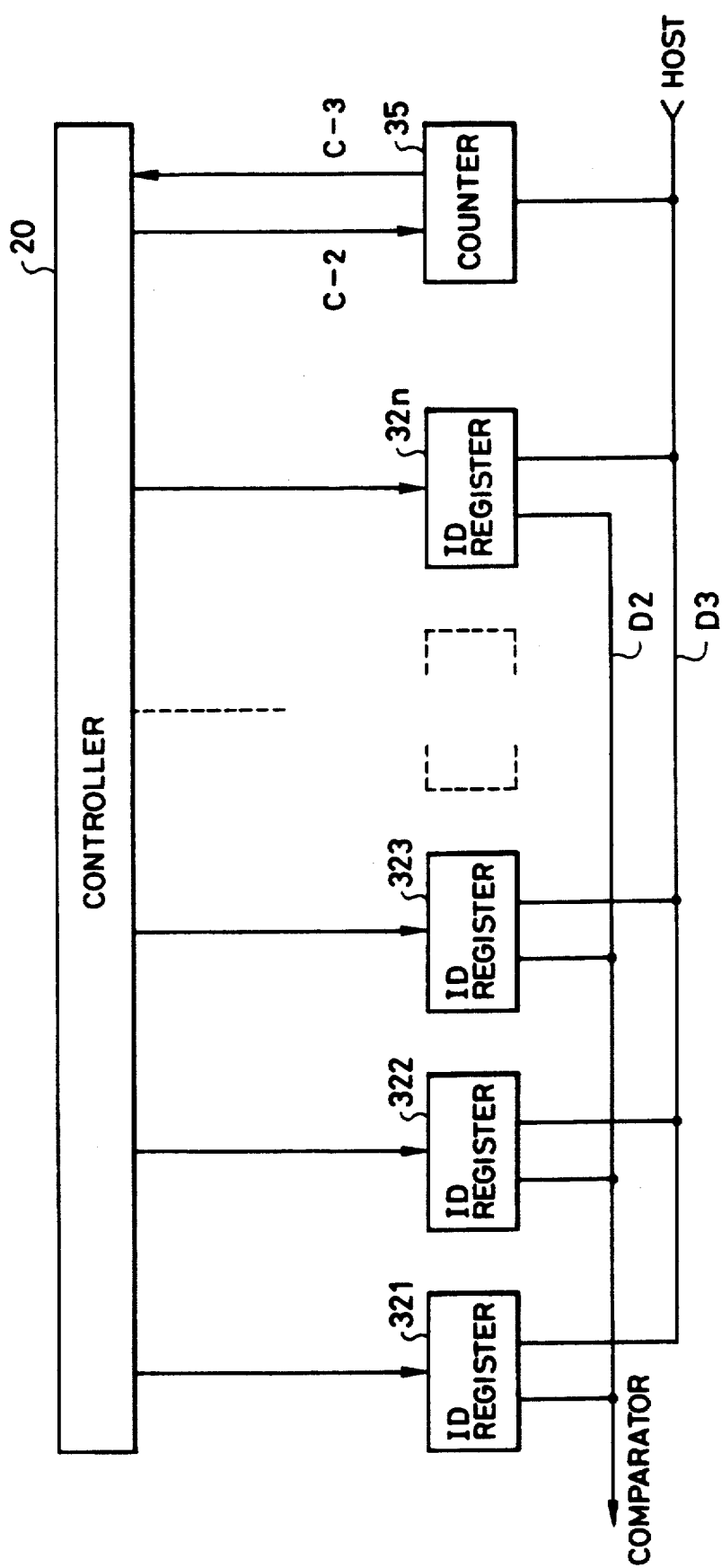
FIG. 2C is a block diagram of a second principal section in the disk control unit of the invention.

FIG. 2C is a schematic block diagram of a second principal section in the disk control unit of the present invention shown in FIG. 2A. In a case that the disk format is different, the ID field representing the structure of the sector address etc., is also different. Therefore. the present invention is equipped with an ID field memory devices 32 capable of storing a plurality of address marks and ID information, and a count means 35 for counting the byte length of the ID field. In this diagram, the ID field memory devices 32 consists of ID registers 321-32n where the address marks of ID fields and ID information are stored, And in the count devices 35 is stored the byte length of the ID field. As will be described in detail later, the ID field memory devices 32 produces output information from the designated one of the entire ID registers 321-32n. Meanwhile the count devices 35 repeats its decrement in response to each designation of the ID register and produces an output "0" to the controller 20 at the end of processing the ID field information.

FIG. 3 is a detailed diagram of principal components in the disk control unit of the present invention shown in FIGS. 2A, 2B and 2C. In this embodiment, the command buffer group 15 consists of command buffers 151, 152 and 153 for respectively storing operation information, operation length information/fixed pattern, and operation length information. The counter 35 shown in FIG. 2C is used in common to the counter 26 in FIG. 2B.

Denoted by 24 is a selector for connecting the command buffer 152 to a pattern register 25 or a counter 26. The pattern register 25 serves to store data to be written in the disk apparatus. Meanwhile, the counter 26 reads out the operation length information from the command buffer 152 or 153, then decreases its count in accordance with execution of the processing step, and generates an operation end signal. There are further shown a loop counter 27 for storing the number of jumps and decreasing its count at each jump to finally generate an operation end signal; an address controller 28 for controlling the addresses of the command buffer group 15; an ECC/CRC circuit for forming and detecting ECC (error check code) or CRC (cyclic redundancy code); a comparator 30 for comparing the read data; a selection register 31 for generating a signal to select one of the ID register group 32 to be changed; the ID register group 32 for storing address marks of ID fields or ID information; an AND circuit group 33 for selecting the ID register group 32; and a DATA address mark register group 34 for storing the address marks of data fields.

First a description will be given on the entire operations with reference to FIG. 2A. The host 11 instructs the micro computer 13 via the register 12 to feed an input/output command to the disk apparatus 19. More specifically, the input/output command includes information representing the number and the format of the disk apparatus, information representing read or write operation for a sector composed of an ID field and a DATA field, information representing the storage address of a sector on the disk apparatus, and information representing the number of sectors to be inputted or outputted. The micro computer 13 receives the input/output command and performs a designated operation in accordance with a program stored in the memory 14. More specifically, a desired disk apparatus 19 is selected, and a seek operation is performed to displace a head of the selected disk apparatus to a track position where the sector to be read or written is existent. And in response to the information representing read or write operation, a group of disk control information are stored in the command buffer group 15 in compliance with the format of the disk apparatus 19. Furthermore, the information representing the sector storage address and the number of sectors are set in the ID registers 321-32n and the loop counter 27 (See FIG. 3). Subsequently the micro computer 13 instructs the control circuit 16 to perform a read or write operation. Data transfer between the host computer 11 and the disk apparatus 19 is performed via the data buffer 18 and the serial/parallel converter 17.

Figure 4:
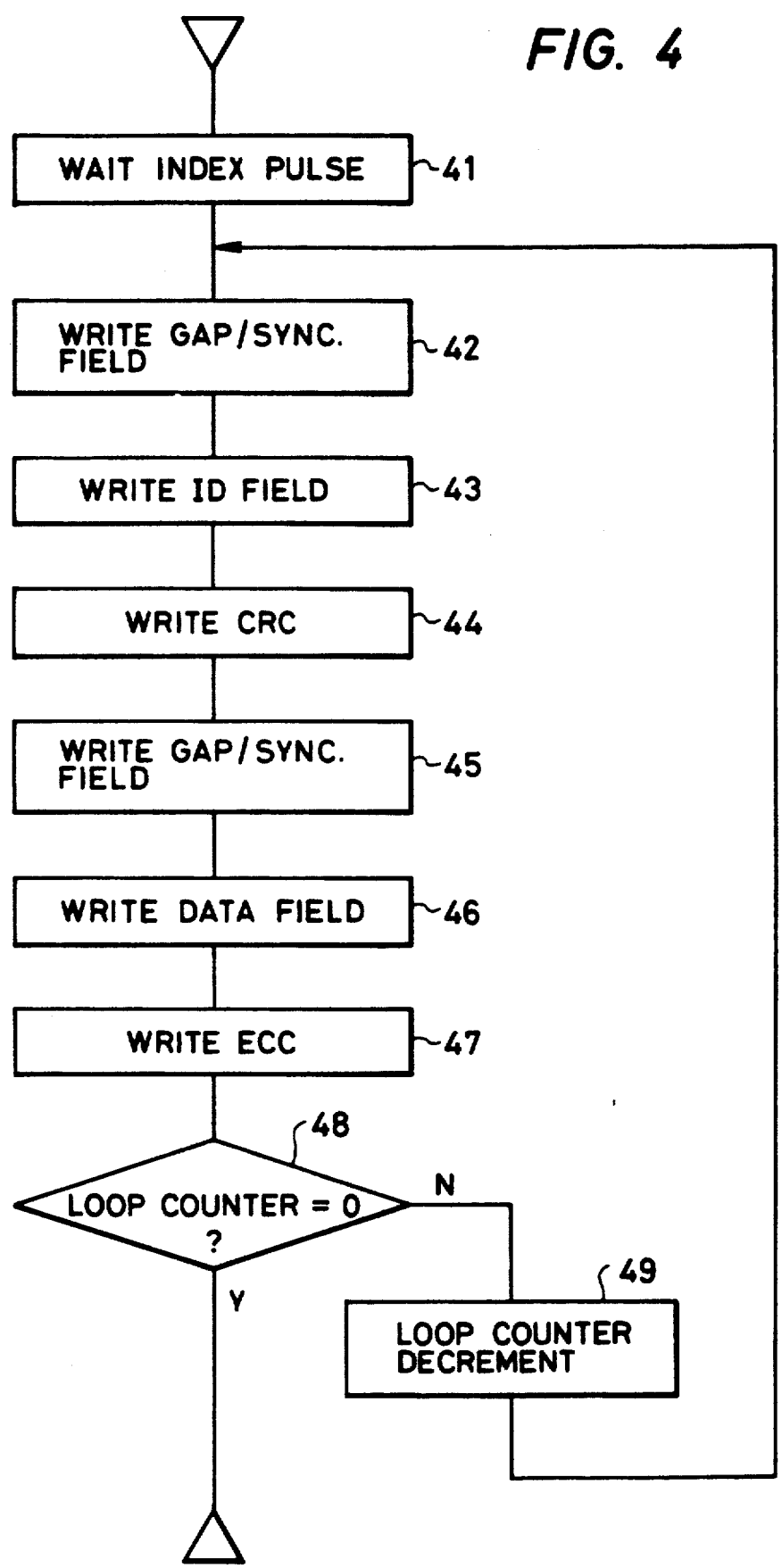
FIG. 4 is a flow chart of write format processing steps executed in the embodiment of FIG. 3.

Now the write format of the disk apparatus according to the present invention will be described in detail below with reference to FIGS. 3, 4, 5 and 10. FIG. 4 is a flow chart of write format processing steps; FIG. 5 shows disk control information used to execute the write format processing steps; and FIG. 10 shows a write format pattern to be processed by the procedure of FIG. 4. In FIG. 4, the disk control unit waits for an index pulse (See FIG. 10) from the disk apparatus 19 in step 41 and, upon arrival of the index pulse, writes a gap/sync field in step 42. Subsequently, an ID field and a CRC are written in steps 43 and 44 respectively. Then the gap/sync field is written in step 45, and a DATA field and an ECC are written in steps 46 and 47, respectively. Next in step 48, the operation is completed if the content of the loop counter 27 is 0 and, if not, the loop counter 27 is driven decrementally in step 49 and the procedure jumps back to step 42.

In order to execute such format write processing steps, the micro computer 13 stores, at initial setting, a group of disk control information including operation information, operation length information/fixed pattern, and operation length information respectively in the command buffers 151, 152 and 153. Furthermore, there is set in the loop counter 27 a value which is smaller by 1 than the number of repeating the step of FIG. 4, i.e. the number of sectors for write format. And in response to the format information obtained from the host computer 11, the micro computer 13 stores the ID field address mark in the ID register 32 and also stores the DATA field address mark in the DATA address mark register 34. And finally the content of the address counter 23 is cleared to start the control circuit 16.

The control circuit 16 thus activated first reads out an index wait command from the address 0 in the command buffer 151 via the line C10 and then waits for an index pulse outputted from the disk apparatus 19 via the line C14. And the command buffer 152 is connected to the counter 26 in response to signals obtained from the selector 241 and the command buffer 151 via the line C10. The command buffer 153 is also connected to the counter 26. Then the two-byte operation length 0 stored at an address 0 in each of the command buffers 152 and 153 is loaded in the counter 26. The counter 26 indicates to the address controller 28 via the line C8 that the content is 0. Upon detection of the index pulse from the line C14, the control circuit 16 feeds a signal, which represents the end of the processing step, to the address controller 28 via the line C20. And in response to such end signal, the address controller 28 increases the address counter 23 via the line C3 and reads out a command from the address 1.

The operation information obtained from the address 1 includes a gap/sync field write command and a jump pointer set command as shown in FIG. 5, so that the control circuit 16 indicates to the disk apparatus 19 via the line C14 that the procedure is a write step. The fixed pattern stored in the command buffer 152 via the line C16 is fed through the pattern register 25 to the serial/parallel converter 17 so as to be converted into serial data, which is then written in the disk apparatus 19. The jump pointer set command is read out via the line C5 by the address controller 28, which then loads the address 1 fed via the line A1 from the address counter 23 to the jump pointer register 21. The gap/sync field length of the command buffer 153 read out therefrom is loaded in the counter 26 and is decreased by the address controller 28 via the line C7. Such loading is performed simultaneously with start of executing this command, and the field length is decreased on the byte basis during such execution. And upon arrival of the field length at 0, the counter 26 feeds a corresponding signal to the address controller 28 via the line C8.

When the content of the counter 26 has reached 0, the address controller 28 increases the address counter 23 via the line C3 and reads out the command from the address 2. As shown in FIG. 5, the address 2 registers an ID field write command. The control circuit 16 having read out this command writes in the disk apparatus 19 through the serial/parallel converter 17 the address marks and the ID information stored in the ID registers 331-33m (m<n) in accordance with the byte lengths preset in the register (not shown) of the control circuit 16. Since the selector 24 connects the command buffer 152 to the counter 26, the high-order and low-order byte lengths of the ID fields in the command buffers 152 and 153 are loaded in the counter 26 and then are decreased by the address controller 28. And upon arrival of the count at 0, the result is fed to the address controller 28. Consequently, the address controller 28 increases the content of the address counter 23 and reads out the command from the address 3.

The address 3 registers a CRC write command, so that the CRC is written by the known procedure via the ECC/CRC circuit 29. In this stage, the selector 24 feeds 0 to the counter 26 so that the content of the counter 26 becomes equal to the CRC byte length in the command buffer 153. It is needless to say that the content of the counter 26 is sequentially decreased and the CRC is written in conformity with such byte length. Similarly the content of the address counter 23 is increased by the address controller 28, and the command is read out from the address 4. As shown in FIG. 5, the address 4 registers a gap/sync field write command and, in comparison with the address 1, the same operation is performed with the exception that setting of the jump pointer is not executed. Therefore, a repeated explanation is omitted here.

Subsequently the control circuit 16 reads out a DATA field write command from the address 5. In this stage, the address marks stored in the DATA address mark registers 341-34j (j<n) are written in the disk apparatus 19 via the serial/parallel converter 17 in accordance with the byte lengths preset in the register (not shown) of the control circuit 16 by the micro computer 13. Furthermore, the data written previously in the data buffer 18 by the host computer 11 is also written in the disk apparatus 19. The operation length in this stage becomes equal to the high-order and low-order byte lengths in the command buffers 152 and 153 respectively. Upon completion of processing the DATA field, the address controller 28 increases the address counter 23 and reads out a command from the address 6.

As shown in FIG. 5, the address 6 registers an ECC write jump command. Using the ECC/CRC circuit 29, the control circuit 16 writes the ECC by the known procedure. Since the selector 24 feeds 0 to the counter 26 in this stage, the content of the counter 26 becomes equal to the ECC byte length in the command buffer 153, and the ECC is written in conformity with such byte length. Upon completion of executing the ECC write command, the address controller 28 performs a jump operation. The jump command from the command buffer 151 is inputted to the address controller 28 via the line C6. Then the address controller 28 detects through the line C9 whether the content of the loop counter 27 is 0 or not and, if not 0, the content of the jump pointer register 21 is fed via the line C1 onto the line A2, whereby the content on the line A2 is loaded in the address counter via the line C3. Consequently the content of the address counter 23 becomes 1 to indicate a jump to the address 1 in the command buffer 15. And simultaneously the address controller 28 decreases the loop counter 27 via the line C9. If the content of the loop counter 27 is 0, the address counter 23 is increased to start processing the address 7. Therefore, a predetermined number of the sectors shown in FIG. 10 are formed by repeating the operation between the addresses 1 and 6 the number of times preset in the loop counter 27. Since the address registers an end command therein, the control circuit 16 ends the operation and comes to a halt, hence completing execution of the write format command.

Figure 6:
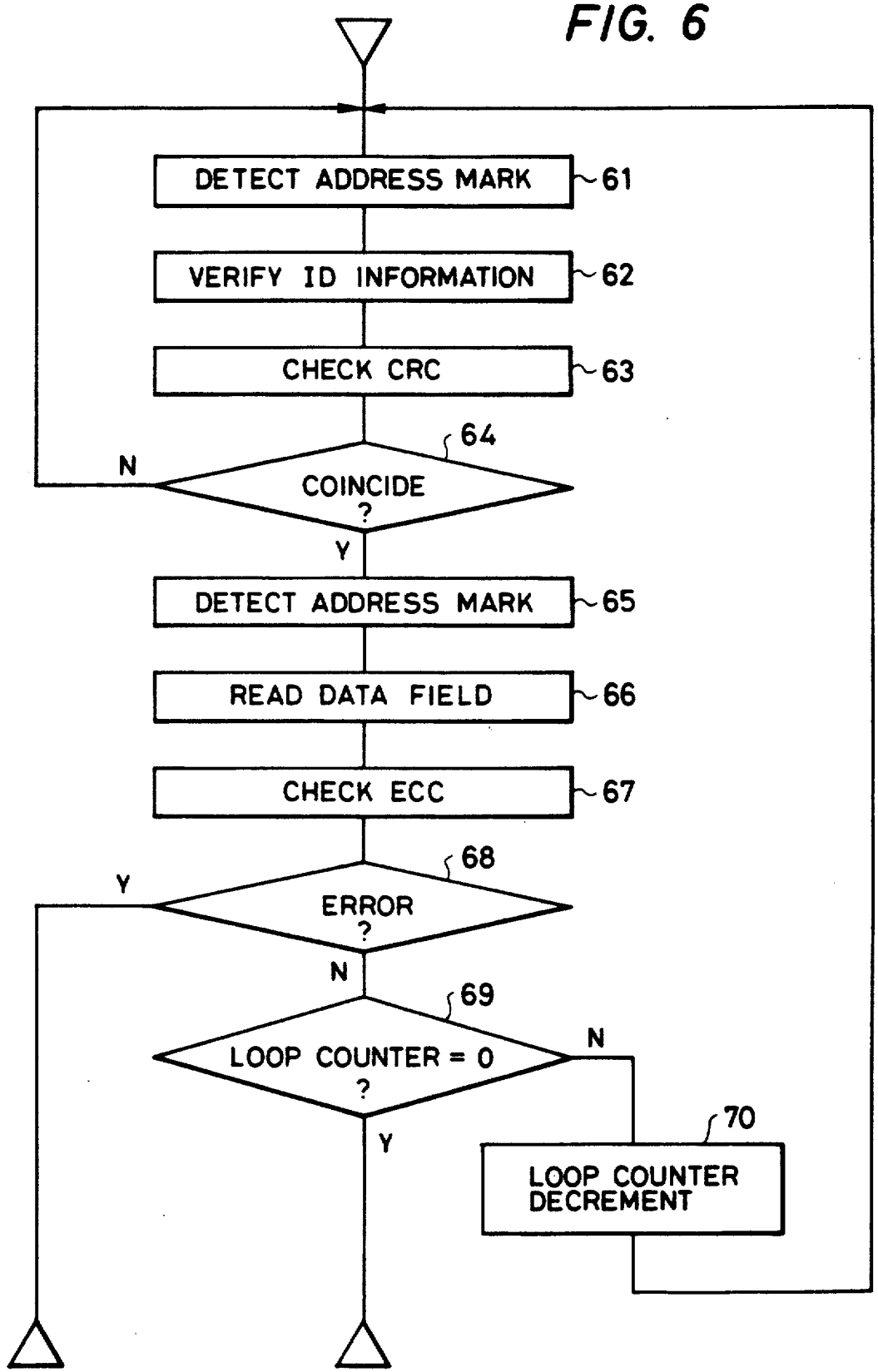
FIG. 6 is a flow chart of reading steps executed in the embodiment of FIG. 3.

Now a read operation will be described below with reference to FIGS. 6 and 7. In the read processing flow chart of FIG. 6, the ID field address mark and the ID information are verified in steps 61 through 63, and also the CRC is checked. In case a coincidence is not attained in step 61, steps 61 through 63 are repeated. And in response to a coincidence, the address mark in the DATA field is detected in steps 65 and 66, and the DATA field is read. The ECC is checked in step 67 and, if it is an error, the procedure is completed. In the case of no error, a check is made in step 69 to detect whether the content of the loop counter 27 is 0 or not. And if it is not 0, the content of the loop counter is decreased in step 70, and then the procedure returns to step 61. In case the content of the loop counter is 0, the read operation is completed.

Figure 7:
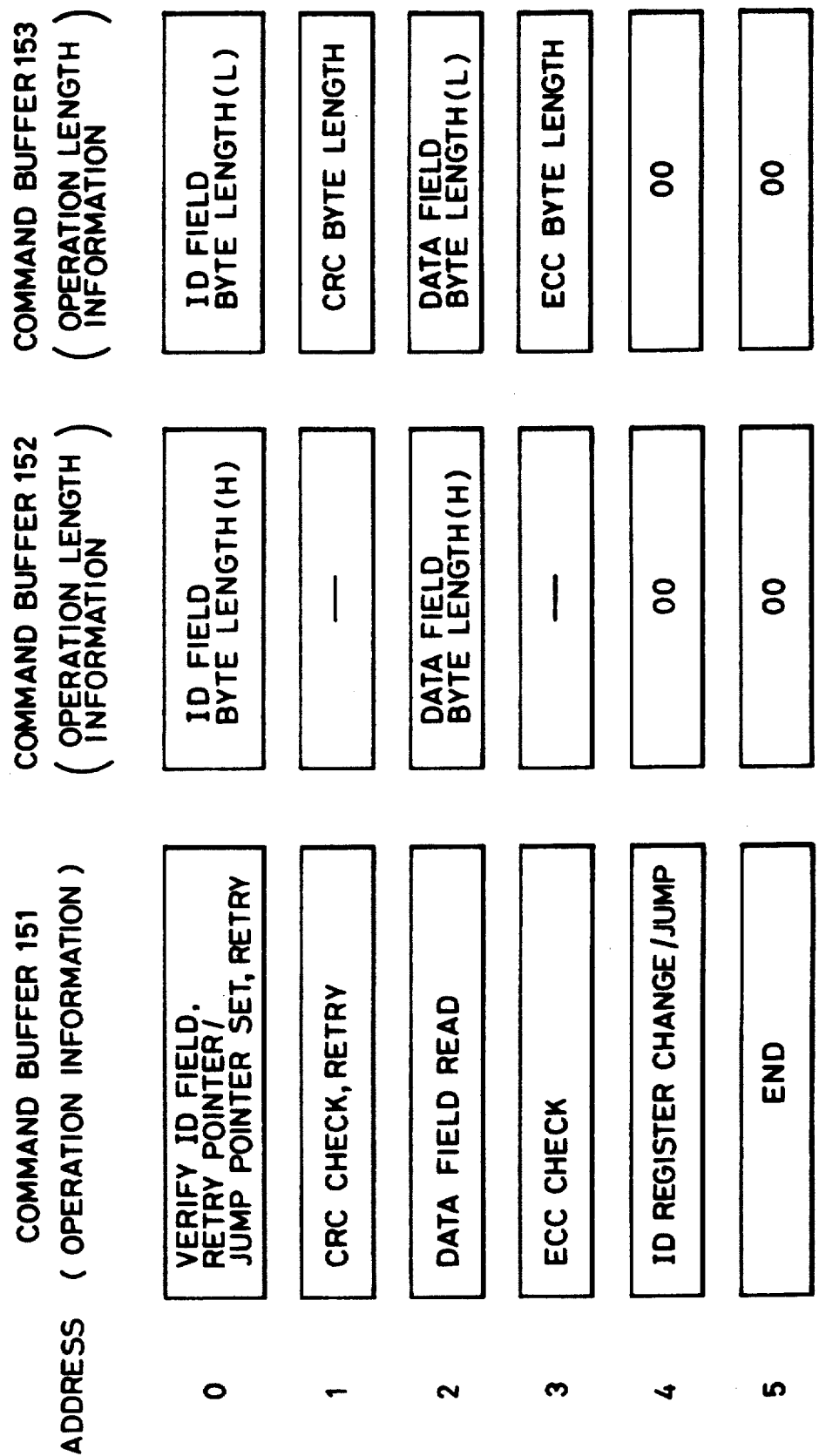
FIG. 7 shows exemplary information stored in the command buffer 15 at the time of read operation in the embodiment of FIG. 3.

In order to perform such operation, the micro computer 13 stores a group of disk control information of FIG. 7 in the command buffers 151, 152 and 153. The micro computer 13 also stores in the loop counter 27 the number of repetitions corresponding to the number of sectors, and further stores in the ID registers 321-32n the address marks and the ID information of the sectors to be read out. When reading out two or more sectors, it is necessary to change the ID information between the sectors. Therefore, a bit of the selection register 31 corresponding to the ID register 32 to be changed is selectively fed in accordance with the information of the format designated by the host computer 11. For example, when the ID register 32$k$ ($1 \leq k \leq n$) is to be changed, "1" is fed through the line C12$k$ to the AND circuit 33$k$ while "0" is fed to any other AND circuits, whereby the ID register change command is executed with respect to the ID register 32$k$ alone. Generally a 1-byte sector address is set in the ID register 32$k$. It is natural that the ID register 32 to be changed is not limited to one alone. The micro computer further stores the DATA address mark in the DATA address mark register 34. And finally the control circuit 16 is started after the content of the address counter 23 is cleared.

In response to the ID field verify command from the address 0, the control circuit 16 transmits the content of the ID register 321 to the comparator 30. Then the comparator 30 compares the input data with the parallel data obtained through the serial/parallel converter 17 by converting the serial data read out from the disk apparatus 19 and, if a coincidence is attained therebetween, the comparator 30 sends such result to the control circuit 16 via the line C17. Subsequently the control circuit 16 transmits the contents of the ID registers 322-32$n$ successively to the comparator 30. And in response thereto, the comparator 30 feeds the resultant coincidence or non-coincidence to the control circuit 16 via the line C17. Such operation is repeated according to the high-order and low-order byte lengths of the ID fields preset in the command buffers 152 and 153 respectively.

The retry ponter set command and the jump pointer set command are fed to the address controller 28 via the lines C4 and C5 respectively. The address controller 28 loads the content of the address counter 23 in the jump pointer register 21 and the retry pointer register 22 via the lines C1 and C2 respectively. Furthermore the retry command is fed to the control circuit 16 via the line C18. In this stage, if a non-coincidence is detected as a result of the aforementioned comparison of the ID fields, a retry instruction is sent to the address controller 28 via the line C19. Then the address controller 28 loads the content of the retry pointer register 22 in the address counter 23 via the lines C2 and C3. It indicates that the procedure advances to execution of the address 0 again.

Resuming now the description of the ID field verify operation, the procedure advances to processing the address 1 upon completion of the verify operation conforming to the ID field byte lengths in the command buffers 152 and 153. At the address 1, as shown in FIG. 7, the CRC is checked according to the CRC byte length, and in response to generation of an error in the CRC, the procedure is retried to execute processing from the address 0 again. At the address 2, similarly to the above-described comparison of ID fields, the address marks of the DATA fields conforming to the byte lengths stored in the registers of the control circuit 16 from the DATA address mark registers 341-34$n$ are fed to the comparator 30 and, if a coincidence is attained, the remaining data corresponding to the DATA field byte length are read out by the data buffer and then are transferred to the host computer 11. If the result of such comparison is a non-coincidence, the operation is completed.

At the address 3, the ECC is checked by comparison in conformity to the ECC byte length. And if the result of such comparison is a non-coincidence, the operation is completed. However, in the case of a coincidence, the ID register change command at the address 4 is executed. In this operation, as mentioned previously, the content of the ID register 32 selected by the output of the selection register 31 is changed by a signal sent from the control circuit 16 via the line C13 to the AND circuit 33. Further at the address 4, a jump command is executed repeatedly between the addresses 0 and 4 by the number of times stored in the loop counter 27, and the read operation is completed at the address 5.

Figure 8:
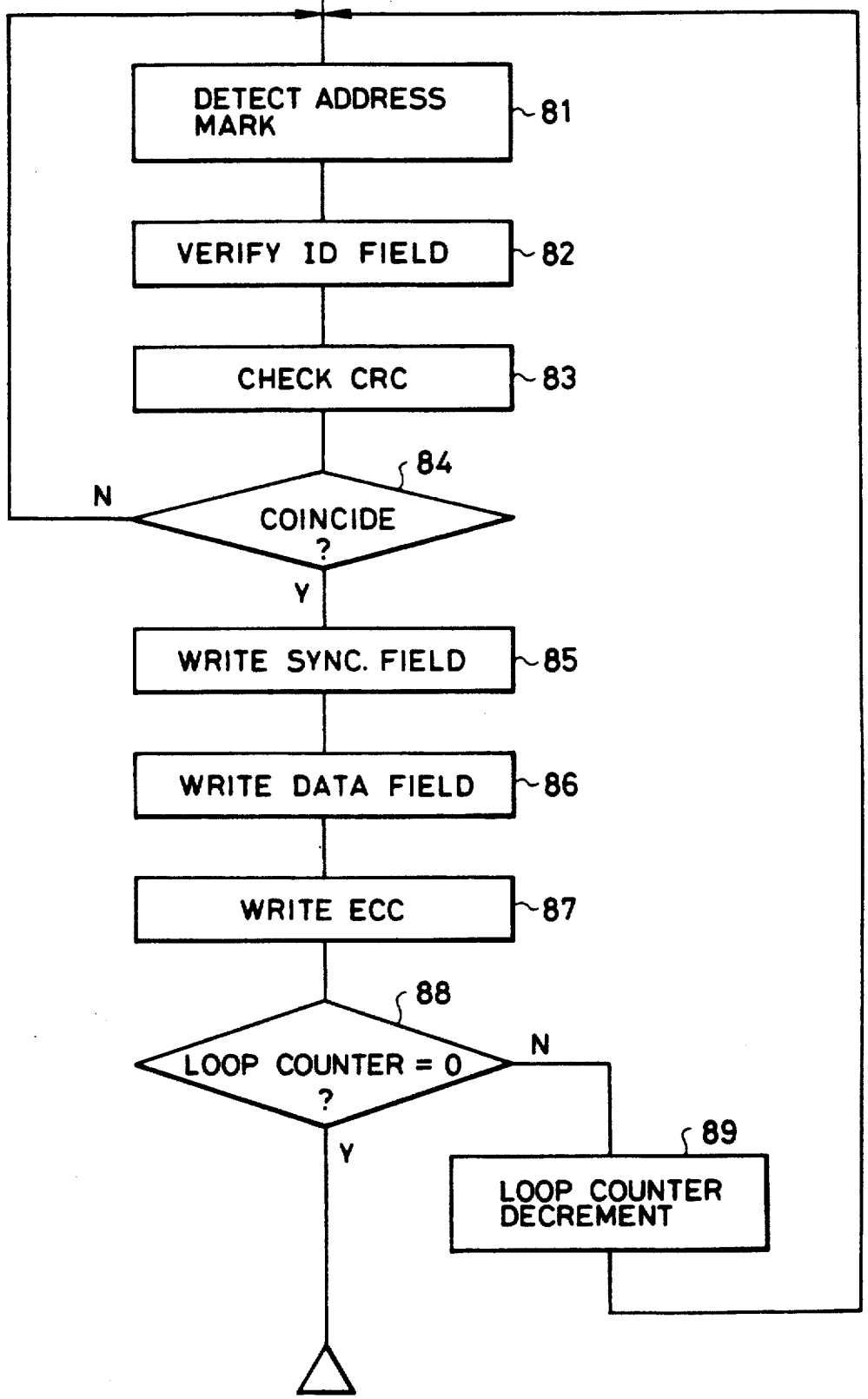
FIG. 8 is a flow chart of write data processing steps executed in the embodiment of FIG. 3.

The write operation will now be described below with reference to FIGS. 8 and 9. In the flow chart of FIG. 8 showing the write processing steps, the ID field verify command and the CRC check command are executed in steps 81 through 83 and, if a non-coincidence is attained in step 84, then steps 81 through 84 are repeated. In the case of a coincidence, the procedure advances to step 85. The sync field, DATA field and ECC are written in steps 85 through 87 and, if the content of the loop counter is detected to be 0 in step 88, the write operation is completed. Meanwhile, if the result is not 0, the loop counter is decreased in step 89 and then the procedure returns to step 81.

In order to perform such operation, the micro computer 13 stores a group of disk control information of FIG. 9 in the command buffers 151, 152 and 153. Also the information similar to those in the aforementioned read operation are stored in the registers. The started control circuit 16 executes the ID field verify command and the CRC check command at the addresses 0 and 1 respectively as in the foregoing read operation. And similarly to the write format operation mentioned above, the sync field, DATA field and ECC are written at the addresses 2, 3 and 4 respectively. Then the ID register 32 is changed at the address 5 and a jump to the address 0 is executed. And finally the write operation is completed at the address 6.

Figure 10A:
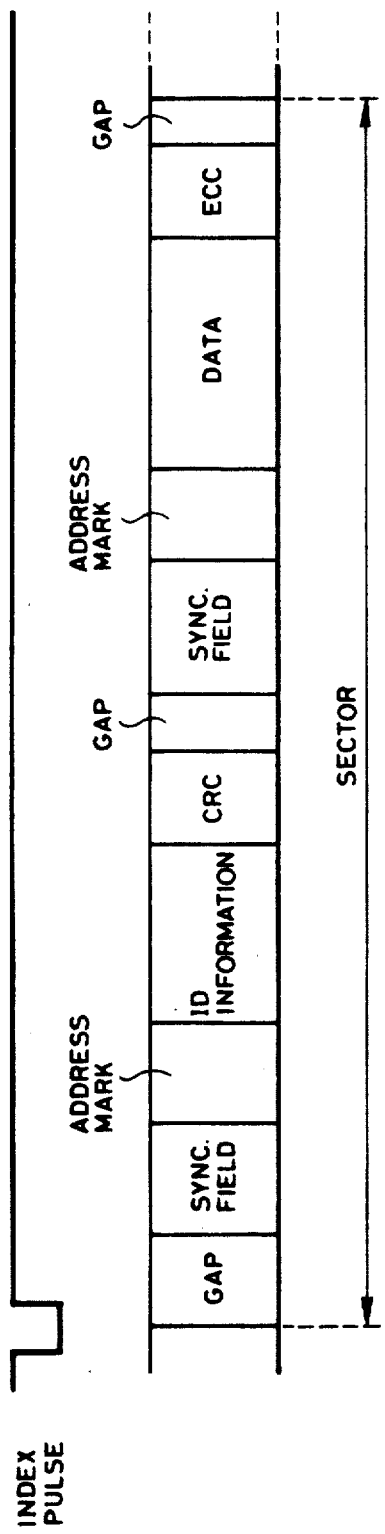
FIG. 10A is a schematic diagram of an exemplary disk format for which the present invention is carried out.
Figure 10B:
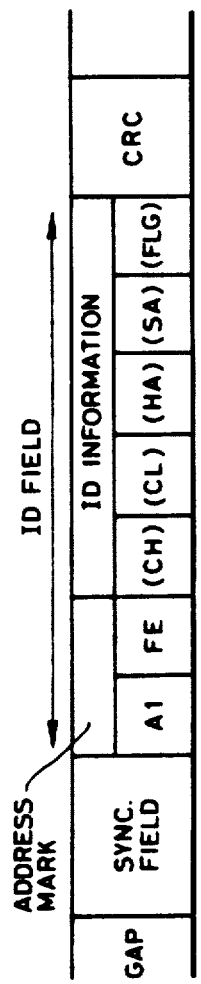
FIG. 10B is a schematic diagram showing details of an ID field in the disk format of FIG. 10A.

FIG. 10A shows an exemplary disk format of one sector, and FIG. 10B shows details of an address mark and an ID information field. In this example, the address mark and the ID information are composed of 2 bytes and 5 bytes, respectively. In the ID information, CH stands for a cylinder high-order address, CL for a cylinder low-order address, HA for a head address, SA for a sector address, and FLG for flag information, respectively. When writing such ID field, a pattern shown in FIG. 11 correspondingly thereto is fed from the micro computer 13 to the ID registers 321-327. And a byte length 6 is set in the counter 26 by the command buffer 153.

In FIGS. 2C and 3 where a plurality n of ID registers are shown, the value of n is so determined as to become the maximum requisite of the total byte length of the ID field address marks and the ID information. Generally in floppy disks, each of the address mark and the ID information is composed of 4 bytes, so that the ID field in this case has a length of 8 bytes. In any case, the ID field write operation is performed by sequentially reading out the data from the ID register 321 in accordance with decrement of the counter 26. Thus, it becomes possible to form a desired ID field in conformity with the disk format, and therefore a disk control unit adapted for any of various disk formats can be constituted. Since the address mark and the ID information are stored in a common register and processed instead of being stored in different registers, wasteful use can be minimized with respect to the register to consequently realize effective utilization.

Relative to the preferred embodiment mentioned above, a description has been given with reference to the exemplary disk format shown in FIGS. 10A and 10B. It is to be understood, however, that the disk control method and unit of the present invention are adapted for disk apparatus of different disk formats and are naturally not limited to the disk format of FIGS. 10A and 10B alone. FIG. 12 shows another exemplary disk format which is a special one of hard sector type. Details of the write format operation, write data operation and read data operation performed by the present invention with regard to such disk format of FIG. 12 are obvious from the aforementioned embodiment, and therefore a repeated explanation is omitted here.

According to the present invention, as described in detail hereinabove, improved disk control method and unit can be constituted in conformity with any of various disk formats regardless of soft sector type or hard sector type, hence achieving a highly economical structure of reduced dimensions.

Furthermore, in this disk control unit where any desired ID field can be formed, the address mark and the ID information corresponding to each of various disk formats are stored in a common register and processed instead of employing different registers, so that wasteful use is minimized with respect to registers.

What is claimed is:

1. A disk control unit for controlling transfer of disk data between a host computer and a disk apparatus, comprising:

storing means for storing a plurality of sets of operation command and operation length information, wherein in each set said operation command indicates an operation to be performed by said unit and said operation length information indicates operation length of said operation command;

means for sequentially generating addresses, each address being applied to said storing means to consecutively read out sets of operation command and operation length information;

address storing means for storing said sequentially generated addresses;

count means for counting a value in response to execution of an operation command of a set read out of said storing means, and producing an operation end signal when said value becomes equal to operation length information of said set;

means for controlling said addresses stored in said address storing means in response to execution of said operation command and in repone to said operation end signal produced by said count means; and means for transferring disk data between said host computer and said disk apparatus in response to execution of said operation command.

2. The disk control unit according to claim 1, further comprising:

a plurality of ID field memory means for storing predetermined numbers of bytes of address marks and ID information of the disk data to be recorded in said disk apparatus.

3. The disk control unit according to claim 2, further comprising:

means for changing one of said ID information stored in said ID field memory means during a multisector processing operation to read or write a plurality of sectors from or to said disk apparatus.

4. The disk control unit according to claim 1, wherein said address control means has a jump pointer register for setting a jump address in response to said operation command.

5. The disk control unit according to claim 1, wherein said address control means has a retry pointer register for setting a retry address in response to said operation command.

6. A disk control unit for controlling transfer of disk data between a host computer and a disk apparatus, comprising:

storing means for storing a plurality of sets of operation command and operation length information, said operation length information indicates operation length of said operation command;

means for generating an address and applying said address to said storing means to consecutively read out a set of operation command and operation length information from said storing means at said address;

address storing means for storing said address;

count means for counting a value in response to execution of said operation command of said set read out of storing means, and producing an operation end signal when said value becomes equal to said operation length information;

means for controlling said address stored in said address storing means in response to said operation command and said operation end signal produced from said count means; and means for transferring disk data between said host computer and said disk apparatus in response to execution of said operation command;

a plurality of ID field memory means for storing predetermined numbers of bytes of address marks and ID information of the disk data to be recorded in said disk apparatus;

wherein said ID field memory means includes a plurality of ID registers, each of which stores data of one byte therein.

7. A disk control unit for controlling transfer of disk data between a host computer and a disk apparatus, comprising:

storing means for storing a plurality of sets of operation command and operation length information, said operation length information indicates operation length of said operation command;

means for generating an address and applying said address to said storing means to consecutively read out a set of operation command and operation length information from said storing means at said address;

address storing means for storing said address;

count means for counting a value in response to execution of said operation command of said set read out of storing means, and producing an operation end signal when said value becomes equal to said operation length information;

means for controlling said address stored in said address storing means in response to said operation command and said operation end signal produced from said count means; and means for transferring disk data between said host computer and said disk apparatus in response to execution of said operation command;

means for changing one of said ID information stored in said ID field memory means during a multisector processing operation to read or write a plurality of sectors from or to said disk apparatus;

wherein said changing means includes a register for storing change-indicated information supplied from said host computer, and a group of gate circuits each of which is connected to a corresponding ID field memory means and is opened or closed in accordance with the content of said register.

8. A disk control unit disposed between a host computer and a disk apparatus for controlling transfer of disk storage data therebetween, comprising:

information memory means for storing a plurality of sets each having an operation command and operation length information, said operation command indicates an operation to be performed by said unit and said operation length information indicates operation length of said operation command, said sets of operation command and operation length information being supplied as disk apparatus control information from said host computer correspondingly to fields in a disk format of said disk apparatus;

means for sequentially generating addresses each being applied to said information memory means to consecutively read out sets of operation command and operation length information;

address storing means for storing said sequentially generated addresses;

means for counting a value in response to execution of an operation command of a set read out of said information memory means and for producing an operation end signal when said value coincides with operation length information of said set;

address control means for controlling said addresses stored in said address storing means in response to execution of said operation command and in response to said operation end signal;

ID field memory means for storing data of ID fields of said disk format; and means for transferring disk storage data between said host computer and said disk apparatus in response to execution of said operation command.

9. The disk control unit according to claim 8, further comprising:

means for changing, in response to an instruction from said host computer data of said ID fields stored in said ID field memory means during a multisector processing operation to write or read or to from a plurality of sectors in accordance with the disk format of said disk apparatus.

10. The disk control unit according to claim 9, wherein said changing means includes a register to store the instruction from said host computer.

11. A disk control unit disposed between a host computer and a disk apparatus for controlling transfer of disk storage data therebetween, comprising:

information memory means for storing a plurality of sets of operation command and operation length information, said operation length information indicates operation length of said operation command, said set of operation command and operation length information being supplied as disk apparatus control information from said host computer correspondingly to fields in the disk format of said disk apparatus;

means for generating an address to be applied to said information memory means to consecutively read a set of said operation command and operation length information from said information memory means;

address storing means for storing said address;

means for counting a value in response to execution of said operation command of said set read out of said information memory means and for producing an operation end signal when said value coincides with said operation length information;

address control means for controlling said address stored in said address storing means in response to both said operation command and said operation end signal;

ID field memory means for storing data of ID fields of said disk format; and means for transferring the disk storage data between the host computer and the disk apparatus in response to said execution of said operation command, wherein said address control means has a register for storing a jump address and a retry address in response said operation command.

12. The disk control unit disposed between a host computer and a disk apparatus for controlling transfer of disk storage data therebetween, comprising:

information memory means for storing a plurality of sets of operation command and operation length information, said operation length information indicates operation length of said operation command, said sets of operation command and operation length information being supplied as disk apparatus control information from said host computer correspondingly to fields in the disk format of said disk apparatus;

means for generating an address to be applied to said information memory means to consecutively read a set of said operation command and operation length information from said information memory means;

address storing means for storing said address;

means for counting a value in response to execution of said operation command of said set read out of said information memory means and for producing an operation end signal when said value coincides with said operation length information;

address control means for controlling said address stored in said address storing means in response to both said operation command and said operation end signal;

ID field memory means for storing data of ID fields of said disk format; and means for transferring the disk storage data between the host computer and the disk apparatus in response to said execution of said operation command, wherein said counter means includes a counter being set to a value equal to said operation length information, said counter counting down using said value equal to said operation length information in response to execution of said operation command.

13. A disk control unit for controlling read/write of data from/to a disk apparatus comprising:

first means for storing a plurality of sets of command and operation length information, said operation length information indicating in operation length of said command;

second means for storing said sets of command and operation length information read from said first storing means in response to a selecting signal supplied from a microcomputer;

means for generating an address to be applied to said second storing means to read out a set of command and operation length information stored at said address in said second storing means;

means for counting a number until said number has a predetermined relation with said operation length information of said set read out from said second storing means in response to execution of said command in the disk control unit and for producing an operation end signal;

means for controlling said address generating means in response to said operation end signal, said controlling means including a retry pointing means for setting a retry address in accordance with said execution of said command; and means for reading/writing data from or to the disk apparatus in accordance with said execution of said command.

14. A disk control unit according to claim 13, further comprising:

ID field memory means for storing data of ID fields of a disk format of the disk apparatus.

15. A disk control unit according to claim 14, further comprising:

means for changing data of said ID fields during a multisector process to read or write from or to a plurality of sectors in response to a change indicating signal provided from said micro-computer.

* * * * *